US011076602B2

(12) United States Patent
Steinberg et al.

(10) Patent No.: US 11,076,602 B2
(45) Date of Patent: Aug. 3, 2021

(54) MUMMIFIED MEALY BUG PRODUCT AND METHOD

(71) Applicant: BIO-BEE SDE ELIYAHU LTD., Kibbutz Sde Eliyahu (IL)

(72) Inventors: Shimon Steinberg, Kibbutz Sde Eliyahu (IL); Eyal Erel, Holon (IL)

(73) Assignee: BIO-BEE SDE ELIYAHU LTD., Kibbutz Sde Eliyahu (IL)

( * ) Notice: Subject to any disclaimer, the term of this patent is extended or adjusted under 35 U.S.C. 154(b) by 0 days.

(21) Appl. No.: 16/710,960

(22) Filed: Dec. 11, 2019

(65) Prior Publication Data
US 2020/0113187 A1    Apr. 16, 2020

Related U.S. Application Data

(62) Division of application No. 14/116,931, filed as application No. PCT/IL2012/000188 on May 10, 2012.

(60) Provisional application No. 61/484,685, filed on May 11, 2011.

(51) Int. Cl.
*A01N 63/14*     (2020.01)

(52) U.S. Cl.
CPC .................................. *A01N 63/14* (2020.01)

(58) Field of Classification Search
CPC ......... A01N 63/00; A01N 63/10; A01N 63/14
See application file for complete search history.

(56) References Cited

U.S. PATENT DOCUMENTS

| 3,786,594 A | 1/1974 | Scott, Jr. |
| 4,260,108 A | 4/1981 | Maedgen |

FOREIGN PATENT DOCUMENTS

| CN | 2810197 | 8/2006 |
| EP | 0210447 | 2/1987 |

OTHER PUBLICATIONS

Sandanyaka et al. New Zealand Plant Protection 58 (2005) 311-314.
Chong et al. Entomologia Experimental is et Applicata vol. 121, Issue 1, (Oct. 2006) pp. 39-50.
Cloyd, R. A. "Know your friends:Leptomastix dactylopii" Internet Archive Date: Nov. 28, 1999. [Retrieved from the Internet on: Aug. 5, 2016]. Retrieved from: <URL: https://web.archive.org/web/19991128144737/http://www.entomology.wisc.edu/mbcn/kyf411.html>.
Yigits et al. Proceeding of the International Symposium on Sscale Insect Studies Apr. 19-23, 2004. pp. 383-387.
Olkowski et al."Commercially Available Biological Control Agents". IPM Practicioner. vol. XXV, No. 7/8 (Jul./Aug. 2003) p. 2.
Vasquez et al. "Quality Assessment of Selected Commercially Available Whitefly and Aphid Biological Control Agents in the United States".J. Econ. Entomol. 97(3): 781-788 (2004).
Van Drisesche et al. "Control of Pests and Weeds by Natural Enemies: An Introduction to Biological Control". (2003) pp. 154-155.
International Preliminary Report on Patentability (Chapter I) for PCT/IL2012/000188, dated Nov. 12, 2013.
Hoy M.A. et al., Featured Creatures, Entomology & Nematology, "Pink Hibiscus Mealybug", May 1998, University of Florida, available on-line: http://entnemdeptufl.edu/creatures/om/mealybug/mealybug.htm.
Kerns D. et al., "Citrus Mealybug (*Planococcus citri*)", part of the publication "Citrus Arthropod Pest Management in Arizona", The University of Arizona, College of Agriculture, Tucson, Arizona 85721, available on-line: hllps://cals.arizona.edu/crops/citrus/insects/citrusinspub.html#mealybug.
Mansaur et al. J. Ent. Acar. Res. Ser II, 42(3): 161-170. (Year: 2010).
Moulton et al. Methods of Analysis by the U.S. Geological Survey National Water Quality Laboratory Processing, Taxonomy, and Quality Control of Benthic Macroinvertebrate Samples. Denver, CO. 54 pages. (Year: 2000).
Sandanayaka et al., Aspects of the reproductive biology of Pseudaphycus maculipennis (Hym: Encyrtidae), a parasitoid of obscure mealybug, *Pseudococcus viburni* (Hem: Pseudococcidae), Biological Control, Jan. 1, 2009, pp. 30-35,vol. 48 (1 ), San Diego, CA.
Chong et al., Functional response and progeny production of the Madeira mealybug parasitoid, *Anagyrus* sp. nov. nr. sinope: The effects of host and parasitoid densities, Nov. 9, 2006, pp. 320-328, vol. 39, (3), San Diego, CA.
Amarasekare et al., "Efficiency and establishment of three introduced parasitoids of the mealybug Paracoccusmarginatus (Hemiptera: Pseudococcidae)", Biological Control, Oct. 1, 2009, pp. 91-95, vol. 51 (1 ), San Diego, CA.
"Citrus Mealybug Parasite Leptomastix dactylopii", Retrieved at <<http:i/web.archive.org/web/20061029025952/http://www.rinconvitova.com/bulletins product_pdf/Leptomastix_BUL.pdf>>, Jan. 1, 2006.
International Search Report and Written Opinion dated Aug. 20, 2012 in corresponding International Application No. PCT/IL2012/000188.

(Continued)

*Primary Examiner* — Amy L Clark
(74) *Attorney, Agent, or Firm* — Gary J Gershik (57) ABSTRACT

A Biological Control Agent (BCA) system comprising processed parasitized mealybug mummies is disclosed. The processed and modified parasitized mealybug mummies are essentially devoid of their limbs and waxy covering. In the novel BCA system the modified parasitized mealybug mummies are processed in a manner that strips off their waxy covering and detaches their limbs without impacting on their viability as a host for parasitoid pupae. The modified parasitized mealybug mummies of the BCA system are encased in specially adapted packaging for delivering and distributing the modified parasitized mealybug mummies to plants with mealybug infestations. A method of preparing and storing the modified parasitized mealybug mummies as a BCA is also presented.

20 Claims, 9 Drawing Sheets

(56) References Cited

OTHER PUBLICATIONS

Rincon-Vitova Insectaries. "*Anagyrus pseudococci*, Mealybug parasite". Internet archive date: Jul. 17, 2001 Retrieved from the Internet: <URL: https://web.archive.org/web/20010717090134/ https://www.rinconvitova.com/parasite.htm#Aphytis melinus, the golden chalcid, Armored Scale parasite>. (Year: 2001).
"Citripar: Anagyrus pseudococci." Partners with Nature. Koppert Biological Systems. Product description (Apr. 26, 2010).
"Citripar: new opportunities for Integrated Pest Management against citrus and vine mealybug." Partners with Nature. Koppert Biological Systems. Press release, Apr. 26, 2010.
"Citrus Mealybug Parasite: Leptomastix dactylopii." Syngenta Bioline. Rincon-Vitova product sheet as archived on Oct. 29, 2006.
"Coccidoxenoides perminutus (Planopar); a welcome biological solution for citrus mealy bug." Partners with Nature. Koppert Biological Systems. Feb. 2, 2009.
"Planopar keeps the citrus mealy bug under control." Partners with Nature. Koppert Biological Systems. Sep. 29, 2009.
Affidavit of Prof. Zvi Mendel dated Nov. 16, 2017 in connection with European Patent No. 2706856.
Cloyd, R. A. "Know your friends—Leptomastix dactylopii." Midwest Biological Control News. Purdue University. Published Nov. 1997. Retrieved Mar. 23, 2017.
Daan, K. M. et al. "Temperature-dependent development of Anagyrus pseudococci (Hymenoptera: Encyrtidae) as a parasitoid of the vine mealybug, *Planococcus ficus* (Homoptera: Pseudococcidae)." Biological Control (2004) 31:123-132.
European Patent Office Opposition Division preliminary opinion, dated Mar. 6, 2018 in connection with European Patent Application No. 12727689.7.
Evidence of publication date of Cloyd, R. A. "Know your friends—Leptomastix dactylopii." Midswest Biological Control News (Retrieved May 15, 2017).
Hoy, M. A. et al. "Pink Hibiscus Mealybug, *Maconellicoccus hirsutu* (Green)." University of Florida, IFAS Extension (2002).
Kerns, D. et al. "Cooperative Extension: Citrus Mealybug (*Planococcus citri*)." The University of Arizona, College of Agriculture (2004).
Office Action dated Sep. 30, 2015 in connection with U.S. Appl. No. 14/116,931.
Olkowski, W. et al. "Commercially Available Biological Control Agents." IPM Practitioner, vol. XXV No. 7/8. Jul./Aug. 2003.
Pala Ram, R. K. et al. "Preliminary studies on field parasitization and biology of solenopsis mealybug parasitoid, Aenasius bambawale Hayat (Encyrtidae : Hymenoptera)." J. Cotton Res. Dev. 23(2) 313-315. Jul. 2009.
Pandey, R. R. "Mass Production of Anagyrus Ananatis Gahan (Hymenoptera: Encyrtidae) for the Augmentative Biological Control of Pink Pineapple Mealybug Dysmicoccus Brevipes (Cockerell) (Homoptera: Pseudococcidae)." Dissertation, Dec. 2002.
Pandey, R. R. and M. W. Johnson. "Effects of cool storage on Anagyrus ananatis Gahan (Hymenoptera: Encyrtidae)." Biological Control (2005) 35:9-16.
Simmons, G. S. et al. "Mass-Rearing Bemisia Parasitoids for Support of Classical and Augmentative Biological Control Programs." Classical Biological Control of Bemisia tabaci in the United States. Mar. 2008, pp. 161-178.
Vasquez, G. M. et al. "Quality Assessment of Selected Commercially Available Whitefly and Aphid Biological Control Agents in the United States." Journal of Economic Entomology. 97(3):781-788.
Walton, V. "Mealybug: Biology and control strategies." Wineland Magazine. Mar. 1, 2001.
Written note of oral conversation dated Dec. 13, 2007 regarding alleged public disclosure: discussion between K. Daane and M. Cooper.

```
┌─────────────────────────────────────────────┐
│ MEALYBUGS DETACHED FROM HOST BY A HIGH      │
│ PRESSURE AIR BLOWER                         │ — 21
└─────────────────────────────────────────────┘
                      ↓
┌─────────────────────────────────────────────┐
│ DETACHED MEALYBUGS RUN THROUGH A SIEVING    │
│ TOWER TO SEPARATE DIRT AND SMALL            │ — 22
│ MEALYBUGS                                   │
└─────────────────────────────────────────────┘
                      ↓
┌─────────────────────────────────────────────┐
│ 3^RD INSTAR NYMPHS AND YOUNG FEMALE         │
│ MEALYBUGS OBTAINED BY SIEVING, THEN         │ — 23
│ WEIGHED AND SAMPLED TO ESTIMATE             │
│ POPULATION SIZE                             │
└─────────────────────────────────────────────┘
                      ↓
┌─────────────────────────────────────────────┐
│ MATURE PARASITIC WASPS WEIGHED INSIDE A     │
│ COLD CHAMBER FOR QUANTIFICATION AND         │ — 24
│ PLACED IN VIALS AS STING STOCK FOR THE      │
│ MEALYBUGS                                   │
└─────────────────────────────────────────────┘
                      ↓
┌─────────────────────────────────────────────┐
│ QUANTIFIED MEALYBUGS EXPOSED TO             │
│ QUNATIFIED ADULT WASPS IN A PARASITIZATION  │ — 25
│ CAGE TO PRODUCE MUMMIFIED MEALYBUGS         │
└─────────────────────────────────────────────┘
                      ↓
┌─────────────────────────────────────────────┐
│ TRAY CONTAINING PARASITIZED MEALYBUGS       │
│ REMOVED FROM PARASITIZATION CAGE FOR        │ — 26
│ INCUBATION, CAGE IS REPLENISHED WITH A NEW  │
│ BATCH OF SELECTED MEALYBUGS                 │
└─────────────────────────────────────────────┘
```

MUMMIFIED MEALY BUG PRODUCT AND METHOD

CROSS-REFERENCE TO RELATED APPLICATIONS

This application is a divisional of U.S. application Ser. No. 14/116,931, filed Jan. 13, 2014, which is a § 371 national stage of PCT International Application No. PCT/IL2012/000188, filed May 10, 2012, which claims priority of U.S. Provisional Application No. 61/484,685, filed May 11, 2011, the contents of each of which are hereby incorporated by reference into this application.

BACKGROUND OF THE INVENTION

1. Field of the Invention

The present invention relates to the field of biological control agents for crop protection, and more particularly using mummified products and methods thereof for crop protection.

2. Background Art

The use of insects as Biological Control Agents (BCA) is an expanding field with many advantages over chemical pest control and crop protection. Insect BCA's are able to naturally control other insect species that act as pests on the crop.

Mealybugs, insects of the Pseudococcidae family, feed on the plant juices of greenhouse crops, houseplants and subtropical trees. The female mealybug attaches itself to the plant and secretes a protective waxy layer while sucking the plant's sap and attracting ants. Sooty mould develops on the mealybugs' sugary secretions, known as honeydew, thereby increasing the damage to the plant. Prominent mealybug species include the citrus mealybug *Planococcus citri* (Risso), targeting citrus fruit in particular and the polyphagous *solanum* mealybug, *Phenacoccus solani* (Ferris) that attacks a wide variety of plant species.

Although there are a variety of chemical methods for controlling mealybugs, biological means directly targeting the pest are preferable both for the environment as well as for the potential consumers. In the case of mealybugs, manual removal with water jets or wiping with methylated spirits is an option for smaller manifestations, but is impractical for larger, commercial crops.

In nature there are a variety of mealybug natural enemies that may be advantageous as BCA's in controlling mealybugs, such as the ladybird beetles *Cryptolaemus montrouzieri* (Australian Ladybird), *Scymnus* spp. and a whole array of insect parasitoids.

U.S. Pat. No. 4,260,108 describes a method and apparatus for the airborne dispensation of dry insect eggs, especially those of parasitic wasps such as *Trichogramma* and including any and all other parasite and predator insects that can be useful in biological control. The eggs are dispersed from a container by gravity through a metering device, a spreader distributes the loose eggs in a suitable broadcast pattern, thus providing a method of dispersing non-adult parasitic wasps as BCA's.

Chinese patent application CN2810197 discloses an insect-inducing fruit belt for a fruit tree, taking advantage of the hiding and overwintering habit of pests to trap them and comprises a corrugated board, with an outer sticking face or an inner lining board. The corrugated board is arranged between the inner lining board and the outer sticking face. The insect-inducing belt attracts primary fruit tree pests that overwinter in the peeling cracks of branches, such as spider mites, kang's mealybug, grass shoe scale insects, leaf rollers, etc. The trapping rate of the insect-inducing belt of CN2810197 is up to 95%.

European patent application EP0210447A provides an agent for controlling harmful insects in agricultural and market garden crops in which living, partly grown parasitic wasps intended for the biological control of insects are filled into gelatin capsules for better dissemination and dosage. The parasitic wasps are of two to three different stages of development per capsule. The capsules have at least one perforation to promote hatching of the parasitic wasps and are preferably made delayed soluble and swellable in water.

However, there is a long felt need for an effective, efficient and non-toxic BCA for the control of mealybugs that utilizes a natural parasitoid/host relationship.

SUMMARY OF THE INVENTION

The present invention relates to the field of insect control and more specifically to a system and method of controlling mealybug infestations with a Biological Control Agent (BCA) system.

It is one object of the present invention to disclose a Biological Control Agent (BCA) system comprising processed parasitized mealybug mummies; such that the processed parasitized mealybug mummies are essentially devoid of their limbs and waxy covering.

It is also in the scope of the present invention to disclose a BCA system in which modified parasitized mealybug mummies are processed in a manner that strips off their waxy covering and detaches their limbs without impacting on their viability as a host for parasitoid pupae.

It is also in the scope of the present invention to disclose a BCA system in which processed parasitized mealybug mummies are encased in specially adapted packaging for delivering and distributing said modified parasitized mealybug mummies.

It is also in the scope of the present invention to disclose a BCA system in which processed parasitized mealybug mummies has storage capacity of up to about 28 days.

It is also in the scope of the present invention to disclose a BCA system in which processed parasitized mealybug mummies has storage capacity of between about 14 days to about 28 days.

It is also in the scope of the present invention to disclose a BCA system in which processed parasitized mealybug mummies has storage capacity of up to about 14 days.

It is also in the scope of the present invention to disclose a BCA system, in which the mummified mealybug product is derived from any mealybug species including but not limited to *Planococcus citri, Planococcus ficus, Planococcus vovae, Phenacoccus solani, Phenacoccus madeirensis Phenacoccus herreni, Pseudococcus comstocki, Pseudococcus cryptus, Pseudococcus viburni, Pseudococcus longispinus Dysmicoccus brevipes*, and *Maconellicoccus hirsutus* or any combination therein.

It is also in the scope of the present invention to disclose a BCA system in which the parasitoid is selected from species that parasitize mealybug nymphs or adults, especially endo-parasitic wasps.

In another aspect of the present invention a BCA system is disclosed in which the parasitic wasp is selected from the family Encyrtidae including *Leptomastix algirica* and *Anagyrus pseudococci* or any combination therein.

It is one object of the present invention to disclose a method of controlling mealybug infestations on a plant, comprising the steps of infesting a host plant with $1^{st}$ instar stage of the mealybug; and parasitizing mealybug nymphs and young females; wherein the method further comprises the steps of: (a) detaching mealybug nymphs and young females from said host plant, (b) parasitizing said detached mealybug nymphs and young females; (c) incubating the parasitized mealybugs to produce mummified parasitized mealybug mixture; (d) rinsing the mummified parasitized mealybug mixture; (e) separating out the viable mummified parasitized mealybugs, from said mixture; (f) drying the viable mummified parasitized mealybugs; (g) packaging said viable mummified parasitized mealybugs so as to obtain a processed parasitized mealybug mummy product devoid of limbs and waxy covering; and, (h) administering said parasitized mealybug mummy product to a crop at risk of infestation by mealybugs or to an infested crop, thereby controlling mealybug infestations on said plant.

It is also in the scope of the present invention to disclose a method of controlling mealybug infestations on a plant, wherein the method comprises the steps of; (a) infesting a host plant with $1^{st}$ instar stage of the mealybug; (b) detaching mealybug nymphs and young females from said host plant; (c) parasitizing said detached mealybug nymphs and young females; (d) incubating the parasitized mealybugs to produce mummified parasitized mealybug mixture; (e) rinsing the mummified parasitized mealybug mixture; (f) separating out the viable mummified parasitized mealybugs, from said mixture; (g) drying the viable mummified parasitized mealybugs; (h) packaging said viable mummified parasitized mealybugs so as to obtain a processed parasitized mealybug mummy product devoid of limbs and waxy covering; and, (i) administering said parasitized mealybug mummy product to a crop at risk of infestation by mealybugs or to an infested crop, thereby controlling mealybug infestations on said plant.

It is also in the scope of the present invention to disclose the method as defined above, further comprising the step of storing said packaged mummified parasitized mealybugs before administering it to the plant.

It is also in the scope of the present invention to disclose a method of producing a mealybug BCA, comprising the steps of infesting a host plant with $1^{st}$ instar stage of the mealybug, and, parasitizing said detached mealybug nymphs and young females; wherein said method further comprises the steps of: (a) detaching mealybug nymphs and young females from said host plant; (b) incubating the parasitized mealybugs to produce mummified parasitized mealybug mixture; (c) rinsing the mummified parasitized mealybug mixture; (d) separating out the viable mummified parasitized mealybugs, from said mixture; (e) drying the viable mummified parasitized mealybugs; (f) packaging said viable mummified parasitized mealybugs, said packaged mummified parasitized mealybugs are devoid of limbs and waxy covering; and, (g) storing and/or distributing said packaged mummified parasitized mealybugs as a mealybug BCA.

It is also in the scope of the present invention to disclose a method of producing a mealybug BCA, wherein said method comprises the steps of; (a) infesting a host plant with $1^{st}$ instar stage of the mealybug; (b) detaching mealybug nymphs and young females from said host plant; (c) parasitizing said detached mealybug nymphs and young females; (d) incubating the parasitized mealybugs to produce mummified parasitized mealybug mixture; (e) rinsing the mummified parasitized mealybug mixture; (f) separating out the viable mummified parasitized mealybugs, from said mixture; (g) drying the viable mummified parasitized mealybugs; (h) packaging said viable mummified parasitized mealybugs, said packaged mummified parasitized mealybugs are devoid of limbs and waxy covering; and, (i) storing and/or distributing said packaged mummified parasitized mealybugs as a mealybug BCA.

It is a further objective of the present invention to disclose a method of controlling mealybug infestations on a plant, comprising the steps of; infesting a host plant with $1^{st}$ instar stage of the mealybug, detaching mealybug nymphs and young females, parasitizing mealybug $3^{rd}$ instar nymphs and young females, incubating the parasitized mealybugs, rinsing the mummified parasitized mealybug mixture, separating out the viable mummified parasitized mealybugs from said mixture, drying the viable mummified parasitized mealybugs, packaging said viable mummified parasitized mealybugs, and distributing packaged mummified parasitized mealybugs, such that a modified parasitized mealybug mummy product is provided, devoid of limbs and waxy covering and administering said product to a crop at risk of infestation or an infested crop.

It is also in the scope of the present invention to disclose a method of providing a mealybug population for producing a mealybug BCA, such that the step of infesting comprises an additional step of maintaining said mealybug instar nymphs for about 25 days at about 25° C. (for the citrus mealybug) and between about 35 and about 42 days at about 27° C. (for the *solanum* mealybug) and about 60% relative humidity on a factitious plant host, till they reach the $3^{rd}$ instar nymph or young female stage.

In another aspect of the present invention, a method of producing a mealybug BCA is disclosed in which the factitious plant host is a potato sprout.

It is also in the scope of the present invention to disclose the method as defined above, wherein the step of parasitizing, comprises a step of parasitizing mealybug $3^{rd}$ instar nymphs and young females.

It is also in the scope of the present invention to disclose a method of providing a mealybug population for producing a mealybug BCA in which the step of detaching comprises an additional step of blowing mealybug nymphs or young females from their factitious host plant using an air blower.

It is also in the scope of the present invention to disclose a method of providing a mealybug population for producing a mealybug BCA in which the step of detaching comprises an additional step of blowing mealybug $3^{rd}$ instar mealybug nymphs or young females from their factitious host plant using an air blower.

It is also in the scope of the present invention to disclose a method of providing a mealybug population for producing a mealybug BCA, in which the step of parasitizing mealybug nymphs and young females comprises the additional step of separating dirt and small mealybugs from larger mealybugs through a sieving tower.

It is also in the scope of the present invention to disclose a method of providing a mealybug population for producing a mealybug BCA, in which the step of parasitizing mealybug nymphs and young females comprises the additional step of separating dirt and small mealybugs from larger mealybugs through a sieving tower, thereby obtaining $3^{rd}$ instar mealybug nymphs and young females.

It is also in the scope of the present invention to disclose a method of providing a mealybug population for producing a mealybug BCA, in which the step of parasitizing mealybug nymphs comprises the additional step of exposing weighed and quantified mealybug nymphs and young females to the prospective parasitoid population in a parasitization cage.

It is also in the scope of the present invention to disclose a method of providing a mealybug population for producing a mealybug BCA in which the step of parasitizing mealybug nymphs comprises the additional step of exposing weighed and quantified $3^{rd}$ instar mealybug nymphs and young females to the prospective parasitoid population in a parasitization cage.

It is also in the scope of the present invention to disclose the method as defined above, wherein the step of incubating, comprises the additional step of incubating the parasitized mealybugs to produce mummified parasitized mealybug mixture, in a parasitization cage.

It is also a preferred embodiment of the present invention to disclose a method of providing a mealybug population for producing a mealybug BCA, in which the step of incubating parasitized mealybugs comprises the additional step of removing parasitized mealybugs from said parasitization cage to be incubated until the parasitoids reach the pupal or pre-pupal stage, while replenishing the parasitization cage with fresh unparasitized mealybug population.

It is also in the scope of the present invention to disclose a method of providing a mealybug population for producing a mealybug BCA in which the step of rinsing parasitized mealybugs comprises the additional step of rinsing parasitized mealybugs that have reached the parasitoid's pupal or pre-pupal stage through a sieving tower with water spray nozzles, and thereby separating out large viable mealybug mummies from dead and/or small mealybugs.

It is also a preferred embodiment of the present invention to disclose a method of providing a mealybug population for producing a mealybug BCA in which the step of separating out viable parasitized mealybugs mummies comprises the additional step of selecting floating mealybugs and mummies from mixtures that have been drained in a conical water bath.

It is also in the scope of the present invention to disclose a method of providing a mealybug population for producing a mealybug BCA in which the step of drying viable mealybug mummies comprises the additional step of drying said mummies by draining them on a screened tray and exposing them to an air flow in a drying chamber.

It is also a preferred embodiment of the present invention to disclose a method of providing a mealybug population for producing a mealybug BCA in which the packing step comprises the additional step of weighing and quantifying said parasitized mealybug mummies by counting samples under a stereoscopic microscope.

In another aspect of the present invention, a method of providing a mealybug population for producing a mealybug BCA is disclosed in which a quantified population of viable parasitized mealybug mummies is provided for storage or distribution.

It is also a preferred embodiment of the present invention to disclose a method of providing a mealybug population for producing a mealybug BCA in which the packing step comprises the additional step of mixing parasitized mealybug mummies with fine sawdust in a 5:1 ratio, respectively, in a ventilated and labeled plastic container in preparation for storage at 14° C.

It is also in the scope of the present invention to disclose a method of providing a mealybug population for producing a mealybug BCA, in which the distribution step comprises the additional steps of obtaining stored or fresh batches of parasitized mealybug mummies, replenishing them with fine sawdust mixture to the desired level, then placing 2 grams, equivalent to 500-1000 parasitized mealybug mummy individuals in a sealed ventilated container with a detachable adhesive label.

It is also a preferred embodiment of the present invention to disclose a method of providing a mealybug population for producing a mealybug BCA, in which a mummified parasitized mealybug product is provided adapted to be attached to a plant or an object adjoining a crop to function as an effective distribution means of the mealybug BCA at the desired location.

It is one object of the present invention to disclose a method of producing mummified mealybug product devoid of limbs and waxy layer comprising the steps of; incubating mealybugs to the correct nymphal stage or young female on a factitious plant host; detaching the mealybugs with specially adapted air blower from said plant host; obtaining mealybug $3^{rd}$ instar nymphs and young females by separating out detached mealybugs according to size; sampling selected mealybug $3^{rd}$ instar nymphs and young females to estimate population size, exposing selected mealybugs to adult endoparasitoids, incubating parasitized mealybugs until the parasitoids reach pupal or pre-pupal stage and the mealybugs turn into mummies; rinsing and separating out large viable mummies from the population of parasitized mealybugs; drying selected parasitized mealybug mummies on screened tray; such that a mummified parasitized mealybug product is obtained useful as a BCA.

It is one object of the present invention to disclose a mummified parasitized mealybug product, in which each mealybug is essentially devoid of limbs and waxy covering enclosed in a packaged form in a container with detachable adhesive labeling for attaching to a plant or object wherein said mummified parasitized mealybug product is an effective mealybug BCA.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings; wherein.

DETAILED DESCRIPTION OF THE INVENTION

Mealybugs are insects of the Hemiptera order and belong to the Pseudococcidae family. Most species of mealybugs are found worldwide and are polyphagous pests of a wide variety of plant species. The mealybug sucks the sap of the host plant causing direct and indirect damage. The direct damage is in the form of distortion and yellowing of the foliage and sometimes defoliation as well as loss of flowers and fruit if present. The large quantities of honeydew produced by the mealybug which coats stems, leaves, flowers and fruit, serves as a substrate for sooty-mould fungi (*Capnodium* spp.) and also attracts ants, causing indirect damage to the plant. In high quantities, the sooty-mould is unsightly, inhibits photosynthesis and reduces the desirability of the product to the consumer.

The citrus mealybug, *Planococcus citri* (Risso) is a worldwide polyphagous pest of citrus, vineyards, persimmon and ornamental plants in interior plants capes and protected cultures, feeding on plants from over 25 families. The females and nymphal stages are smaller than 118 inch and are soft, oval and wingless and covered with a fluffy white wax ringed with white wax tufts. Males are tiny gnat-like insects that have one pair of wings and do not cause direct damage to plants. Once fertilized by the male, the female will lay about 400 to 600 tiny eggs covered by an ovisac of dense, fluffy white wax and hatch within 2-10 days depending on temperature and other environmental conditions. A temperature of 25° C. and a citrus plant are optimal for the life cycle of the citrus mealybug.

Females undergo 3 nymphal stages while males undergo 4 nymphal stages. Each nymphal stage is separated by a molt.

The citrus mealybug can develop between 2 to 8 generations in a year and can be found on trees on their trunks and branches and on leaves, usually scattered throughout the tree canopy. Although the females are wingless, they may make periodic migrations to the trunk and main branches to lay eggs. Females are unable to migrate by flying and can only move by walking. Passive dispersion of females or nymphs occurs when they are carried by the wind and sometimes by ants that attend the mealybugs' colony.

During the period of citrus fruit set, the young nymphs are particularly active and colonize the calyx of the small, developing fruit and during the summer several generations may develop on the fruit surface, covering it with honeydew and consequently attracting sooty-mould. Chlorotic spots caused by the sooty-mould may lead to reduction in fruit size. Thus the mealybug colonies, honeydew, sooty mould, chlorotic spots and reduced fruit size are visible at harvesting and the cosmetic damage can cause extensive financial loss to the citrus fruit industry.

The *solanum* mealybug *Phenacoccus solani* Ferris is also found worldwide and is a polyphagous species found on over 52 plant species in 25 different botanical families, including many important commercial crops such as pepper, tarragon, tomato, basil, ornamental plants such as *Ornithogalum* and berries such as *Physalis peruviana* and on weeds, particularly *Cyperus rotundus*, *Conyza* spp, *Prosopis farcta* and *Amaranthus* spp.

The *solanum* mealybug measures between ⅕ to ⅛ inches and is yellowy-brown, oval, slightly rounded insect with red legs covered by white mealy wax. The larva hatches inside the female body immediately after spawning, which lasts 4 to 5 weeks and produces about 120 offspring in the lifetime of the female. The *solanum* mealybug preferred optimal temperature is 25° C.

The *solanum* mealybug causes direct and indirect damage to crops in a way similar to the citrus mealybug, by sucking sap and depositing honeydew that attracts both ants and sooty-mould fungi. In addition, the *solanum* mealybug causes deformations and degeneration in young plants and fruits. The plants are weakened by plant-sucking as a result of toxins penetrating the plant during the time that the *solanum* mealybug feeds on the plant.

Other species of mealybugs such as the cryptic or citriculus mealybug (*Pseudococcus cryptus* Hempel), the obscure mealybug [*Pseudococcus viburni* (Signoret),] and the longtailed mealybug [*Ps. longispinus* (Targioni Tozzetti)] cause similar types of damage to extensive variety of commercial agricultural crops.

It is therefore a preferred embodiment of the present invention to provide a non-toxic, mummified mealybug, pupal product adapted to control mealybug populations in a non-toxic manner. In this and other embodiments of the present invention a modified or processed mealybug product is disclosed, substantially adapted from native mealybug populations.

In nature the mealybugs possess a multitude of parasitoid species that lay their egg or eggs inside the mealybug and in which the parasitoid larva and pupa take over the mealybug, preventing further mealybug offspring from being produced. The parasitic wasp *Anagyrus pseudococci* (Girault), is a major parasitoid of vine and citrus mealybug pests and *Leptomastix algirica* Trjapitzin is a parasitoid of the *solanum* mealybug, the cryptic mealybug, the obscure mealybug and the longtailed mealybug. Both parasitoids are members of the Encyrtidae family and act as mealybug parasitoids by laying their eggs in mealybug nymphs or adults.

*A. pseudococci* specializes as a parasitoid of citrus mealybug, *Planococcus citri*, the vine mealybug, *P. ficus* and the cypress mealybug *P. vovae*. However as a polyphagous, world-wide solitary endoparasitoid, it also attacks distantly related mealybug species such as *Pseudococcus comstocki* (Kuwana), *Phenacoccus herreni* Cox and Williams, *Dysmicoccus brevipes* (Cockerell), and *Maconellicoccus hirsutus* Green.

*A. pseudococci* is an arrhenotokous species, meaning that fertilized eggs will produce female offspring whereas non-fertilized eggs will yield males. The female is about 1.5-2 mm in length and brown, with distinctive black and white banded antennae. The male is smaller (0.8-0.9 mm in length), black in color bearing an arch-like pair of antennae.

The preferred hosts for the parasitoid are third instar mealybug nymphs, but the wasps will also readily parasitize second instars as well as young females. The female parasitoid lays a single egg in each host and a female can lay up to about 15 eggs a day if provided with an excess of hosts. Eggs laid in smaller hosts usually produce males. The parasitoid's larva consumes the contents of the mealybug from the inside and pupates inside the mummified skin of the host, emerging through an irregular exit hole gnawed at the posterior end of the mummy. Development of *A. pseudococci* occurs within a temperature range of 13° C. to 38° C. *A. pseudococci* is strongly attracted to light and is rendered inactive in darkness, thus it is able to reproduce most rapidly during the summer months. Under a constant temperature of 34° C., *A. pseudococci* completes development (from egg to adult emergence) in just over 10 days, such that there can be 2-3 parasitoid generations per each host mealybug generation.

*A. pseudococci* disperses actively by flying from one plant to another and/or by walking along the plant in the search for mealybugs. Within 2 weeks it can be found a few dozens of meters from its original release spot. Once encountered, the mealybug host is examined and probed by the ovipositor of the parasitoid. Oviposition success is affected by the defense activity of mealybugs. Ants must be destroyed before releasing *A. pseudococci* because they encourage honeydew secretion by the mealybugs and transfer them from one place to another whilst protecting them vigorously from the parasitoid attack.

The parasitic wasp *L. algirica* is an indigenous species, of unknown origin, and also found in Cyprus, Greece, Near East including: Asian Turkey, Caucasian Russian republics, Georgia, Armenia, Azerbaijan, Lebanon, Syria, Jordan, Sinai Peninsula (Egypt), Arabian peninsula, Iran, Iraq and North Africa. *L. algirica* is a parasitoid of some major mealybug pests such as the *solanum* mealybug, the cryptic mealybug, the obscure mealybug and the long-tailed mealybug. The specificity of *L. algirica* and its capacity to function effectively even at low levels of mealybugs, make this parasitoid superior to mealybug predators. The female is about 1.4-1.5 mm in length, its body moderately robust, generally dark brown, the male is similar to female but smaller (0.9 mm in length). Its antennae are clothed with long setae.

The duration of development from egg to adult of *L. algirica* is temperature dependent and takes 35, 24, and 19 days at temperatures of 20° C., 25° C. and 30° C., respectively. In another embodiment, the duration of development from egg to adult of *L. algirica* takes 20 days at 27° C. Fecundity (at 25° C.) is 5 offspring per female per day but could reach as high as 20 offspring per day. The mean percentages of *L. algirica*'s egg encapsulation by the *solanum* mealybug is low and averaging around 3%, indicating that this parasitoid well fits for biological control of the *solanum* mealybug.

It is therefore a further preferred embodiment of the present invention to provide a modified or processed mummified mealybug product containing a parasitoid pupal product. In this and other preferred embodiments the parasitoid is preferably a parasitic wasp of the Encrytidae family, including but not limited to *L. algirica* and *A. pseudococci*.

Figure 1:
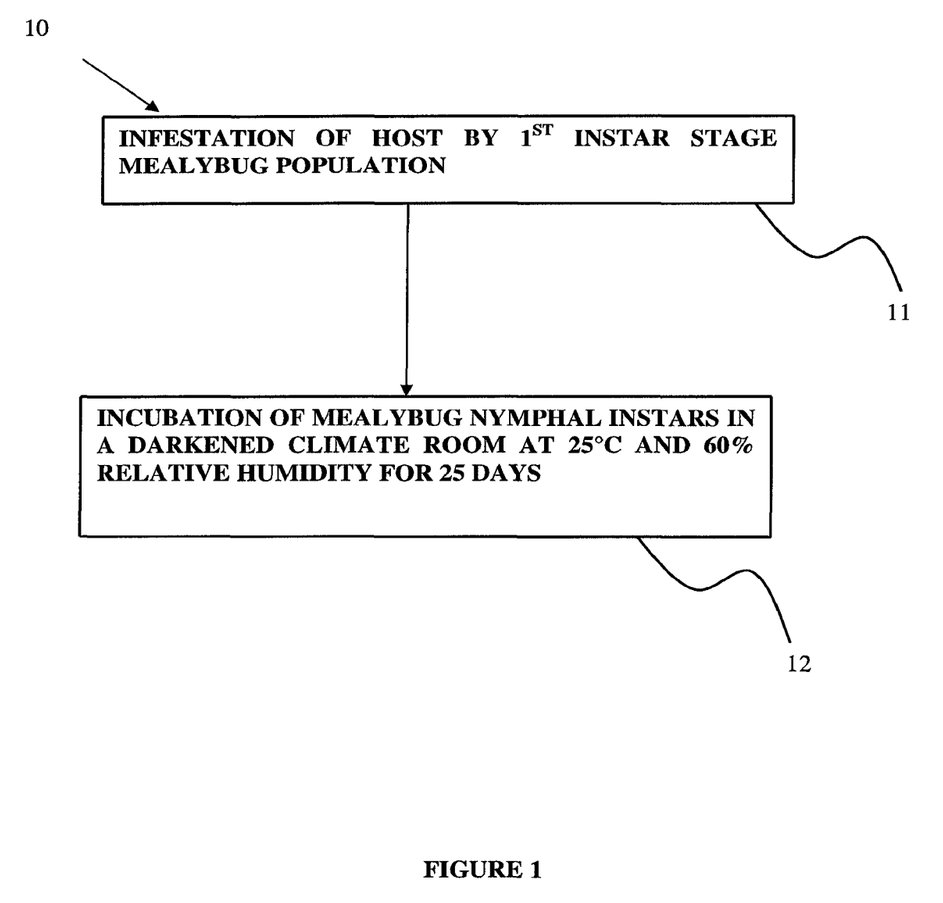
FIG. 1 is a schematic flow diagram illustrating a first incubation stage of the preparation of the mummified pupal product.

Reference is now made to FIG. 1 in the drawings in which a schematic flow diagram is shown illustrating the first stage 10 of the preparation of the mummified pupal product. In this first step of this stage 11 infestation with mealybugs is induced. Mealybug crawlers in the $1^{st}$ instar stage are provided with a factitious plant host, such as potato sprouts and commence to infest the aforementioned factitious host. The mealybug young instars are then kept 12 in a darkened climate controlled room for approximately 21-28 days at about 25° C. (for the citrus mealybug) and about 35-42 days at about 27° C. (for the *solanum* mealybug) both at approximately 60% relative humidity.

Figure 2:
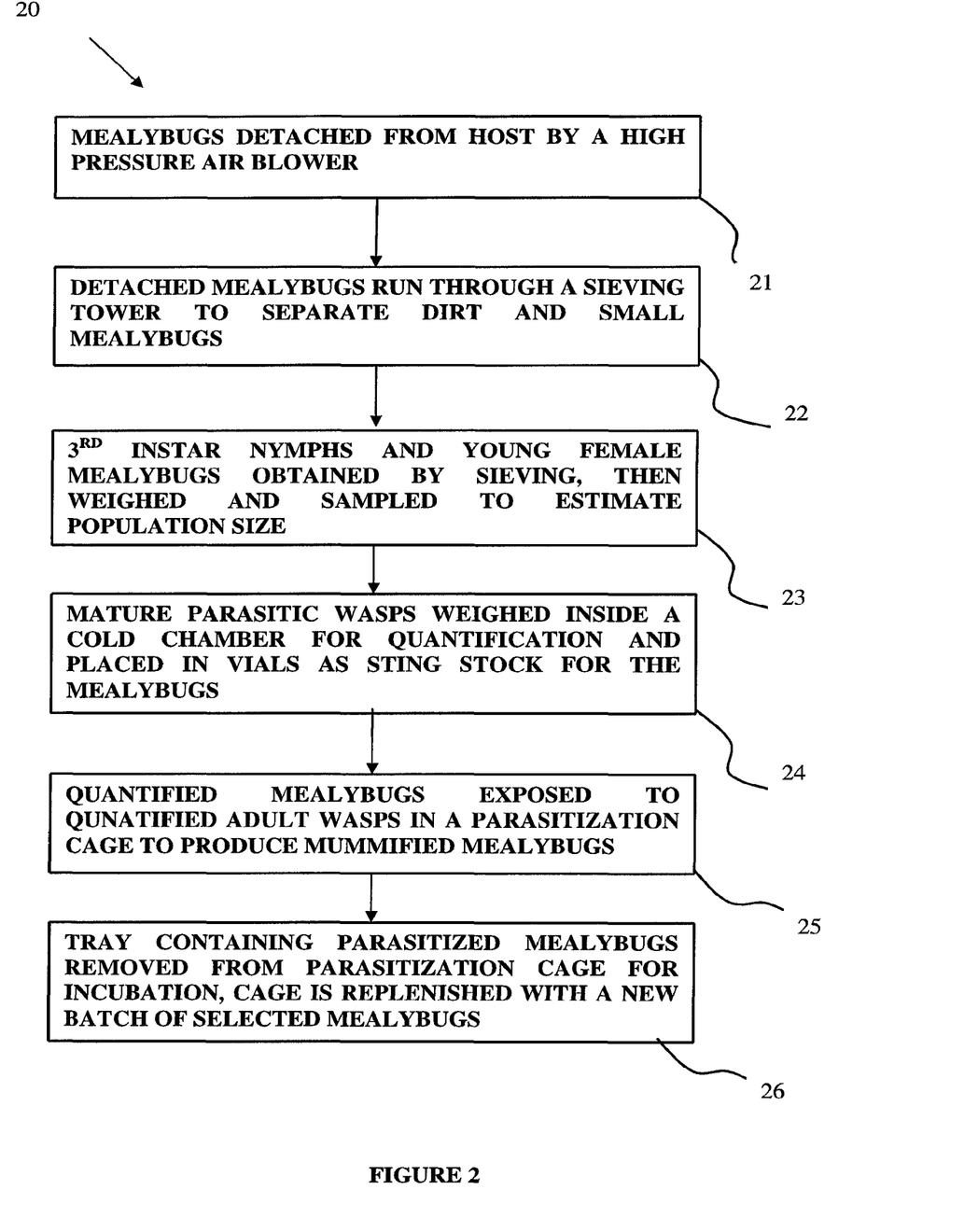
FIG. 2 is a schematic flow diagram illustrating a second exposure to parasitoid stage in the preparation of the mummified pupal product.

FIG. 2 illustrates the second stage of preparation for the mummified mealybug pupal product in which the mealybugs are exposed to the parasitoids 20. Firstly the mealybugs are detached from the potato sprouts using a high pressure air blower 21 and then the detached mealybugs are run through a sieving tower to separate dirt and small mealybugs from the desired stage and size of mealybug 22. The aforementioned sieving process filters out mealybug nymphs, i.e. $3^{rd}$ instar nymphs, and adult females, that are then weighed and sampled in order to estimate population size 23. In the next step of the second stage, mature parasitic wasps are quantified by their weight (the procedure takes place inside a cold chamber to reduce their activity) and are placed in small vials to be used as a sting stock for the mealybugs 24. In the next step the quantified mealybugs are exposed to the quantified adult wasps in a parasitization cage for the production of mummified mealybugs 25. At this stage, the ratio of mealybugs to parasites is variable as is the duration and number of the mutual exposures (3 for the citrus mealybug and up to 12 for the *solanum* mealybug). The parasitized mealybugs' tray is removed from the parasitization cage 26 while the cage is replenished with a new batch of fresh mealybugs. The latter are introduced into the parasitization cage and the tray containing the mealybugs already parasitized is placed in an incubation chamber for the next stage of the process.

Figure 3:
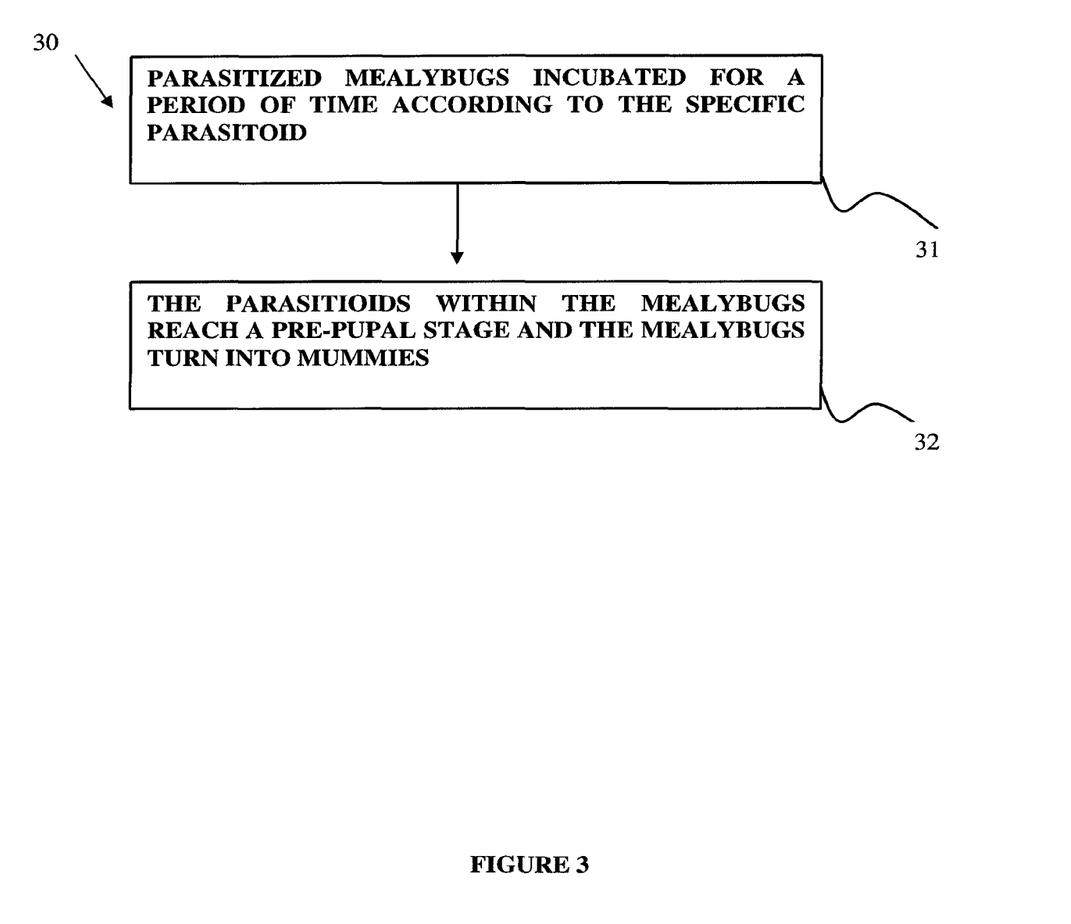
FIG. 3 is a schematic flow diagram illustrating a third incubation stage in the preparation mummified mealybug product.

Reference is now made to FIG. 3 in the drawings schematically illustrating the incubation stage 30 of preparing the mummified mealybug product. In this stage the parasitized mealybugs are incubated for a period of time that is parasitoid specific 31. Before transferring the parasitized mealybugs to the next stage of the preparation, the parasitoids within the mummified mealybugs should be in the pre-pupal or pupal stage 32.

Figure 4:
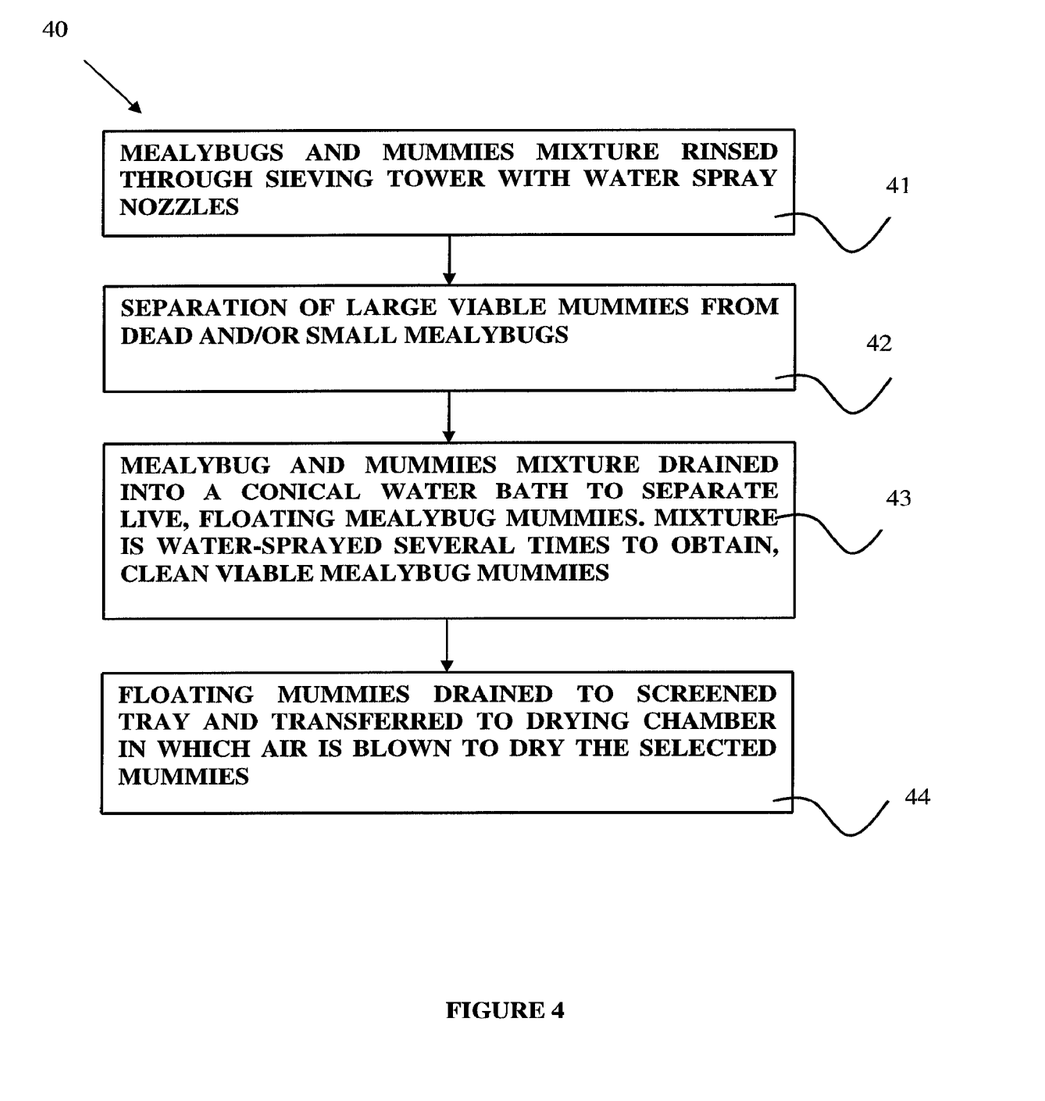
FIG. 4 is a schematic flow diagram illustrating a fourth rinsing and preparation stage in the production of the mummified mealybug product.

FIG. 4 illustrates in a schematic flow diagram, the rinsing and preparation process 40 in the next stage of the production of the mummified mealybug product. In this embodiment, in a first step of the cleaning and rinsing stage, the mix of mealybugs and mummies is rinsed through a sieving tower using water spray nozzles 41. In the next step, viable large mummies are separated from dead and small mealybugs 42. Small mummies are also separated from large mummies, as the former are more likely to yield male wasps. In the next step the mix of mealybugs and mummies is drained into a conical water bath for a second series of separation between viable mummies, dead mummies or mealybugs 43. Live mealybug mummies have a floating trait, thus in the next stage the live mummies are separated and distinguished by this feature and the whole mixture is water-sprayed several times to obtain clean viable mummies. In the next step the floating mummies are drained to a screened tray and transferred into a drying chamber where hot air flow is blown against the separated and selected mummies to dry off water residues 44.

Figure 5:
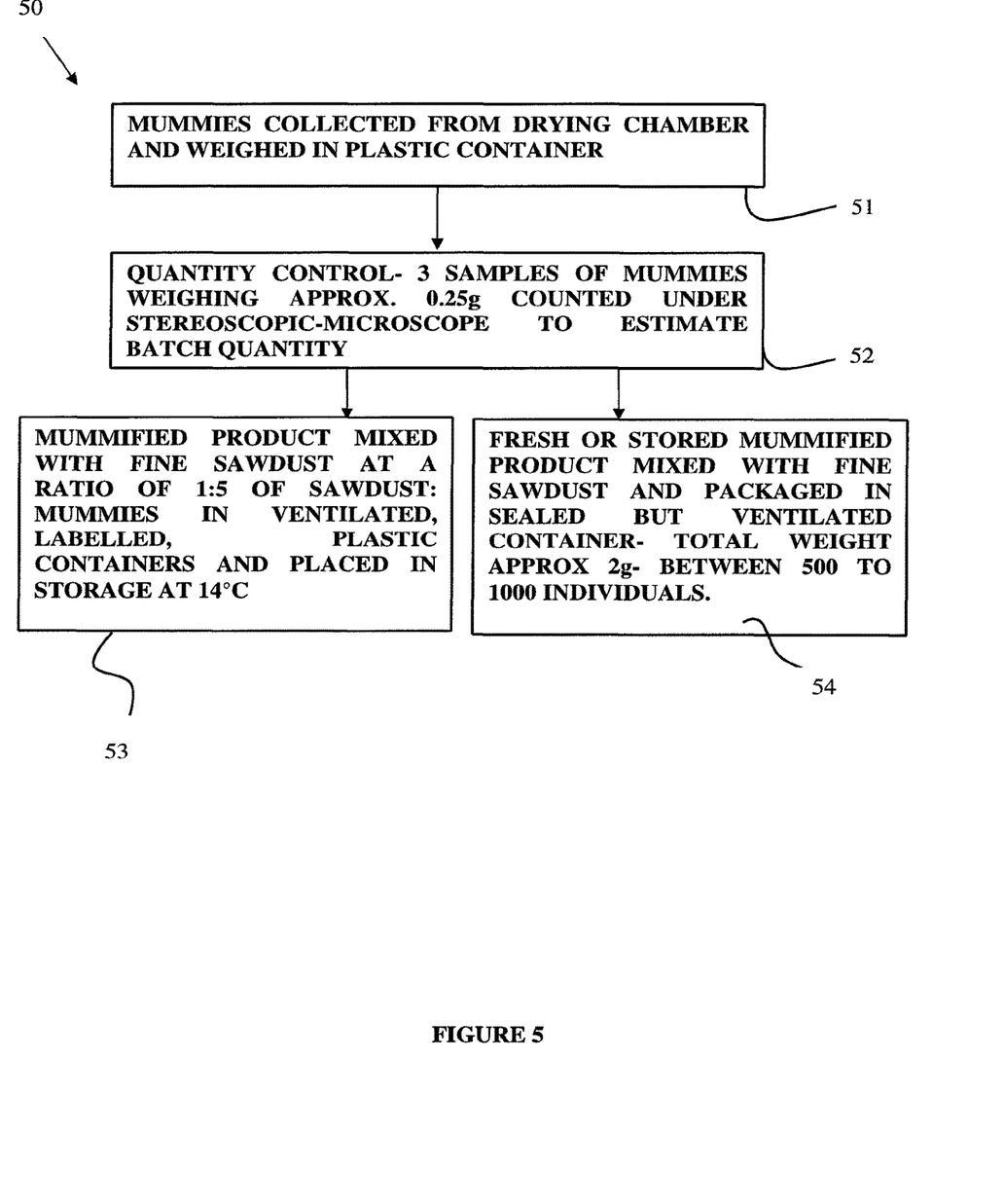
FIG. 5 is a schematic flow diagram illustrating a fifth and final packing stage of the production process of the mummified mealybug product.

Reference is now made to FIG. 5 in the drawings, showing a schematic flow diagram of the final packing stage 50 of the production process. In this stage, the mummies are collected from the drying chamber and transferred to a plastic container and weighed 51. The next step is a quantity control step in which 3 samples of mummies, weighing approximately 0.25 g, are each counted under a stereoscopic microscope to estimate batch quantity 52. In the next step the mummified product is packed either for storage 53 or for marketing 54. Mummified products for storage are mixed with a fine sawdust mixture at a ratio of 1:5 of sawdust to mummies and then are placed in a ventilated plastic container to be stored at 14° C. Each container is labeled individually with the hatch number, packaging date and amount of mummies per package before being put in storage.

In an alternative embodiment, in the next step the mummified product is packed for marketing. In this embodiment the mummies and/or mummies' mixture (taken from storage) are mixed with the fine sawdust to ensure both the right amount of mummies per container and the right weight per package of approximately 2 grams. Each package contains approximately 500 to 1000 individual mummified mealybugs. In another preferred embodiment, the mummified product is packaged for marketing, previous size selection steps ensure that the larger mummies, generally containing female parasitoids, are selected thereby ensuring that at least 50% of the emerging adults are females. In this and other embodiments, a continuous quality control process is carried out to ensure the quality of the mummified pupal product.

In another preferred embodiment of the present invention, the final mummified pupal product is packaged to provide a comprehensive BCA system. In this embodiment the mummified pupal products are packaged in a sealed, ventilated, plastic container, further surrounded by a detachable double-sided adhesive label. In this embodiment the sealed container is distributed to the consumer and when required for use, the adhesive label is partially detached, so as to expose an adhesive surface. Said adhesive surface serves at least two purposes, firstly the partially detached adhesive surface can be used to attach the mummified pupal system to the correct branch or other location on the desired plant. The lid of the packaging is then opened to allow the emerging wasps to escape and parasitize further mealybugs. At this stage, the partially detached adhesive label serves its second purpose. In this embodiment, the adhesive label traps ants and other non-desired walking insects attracted to the mealybugs' mummies and as the emerging parasitoid wasps are capable of flying they are not entrapped by the adhesive label and can fly out uninterruptedly.

Figure 6:
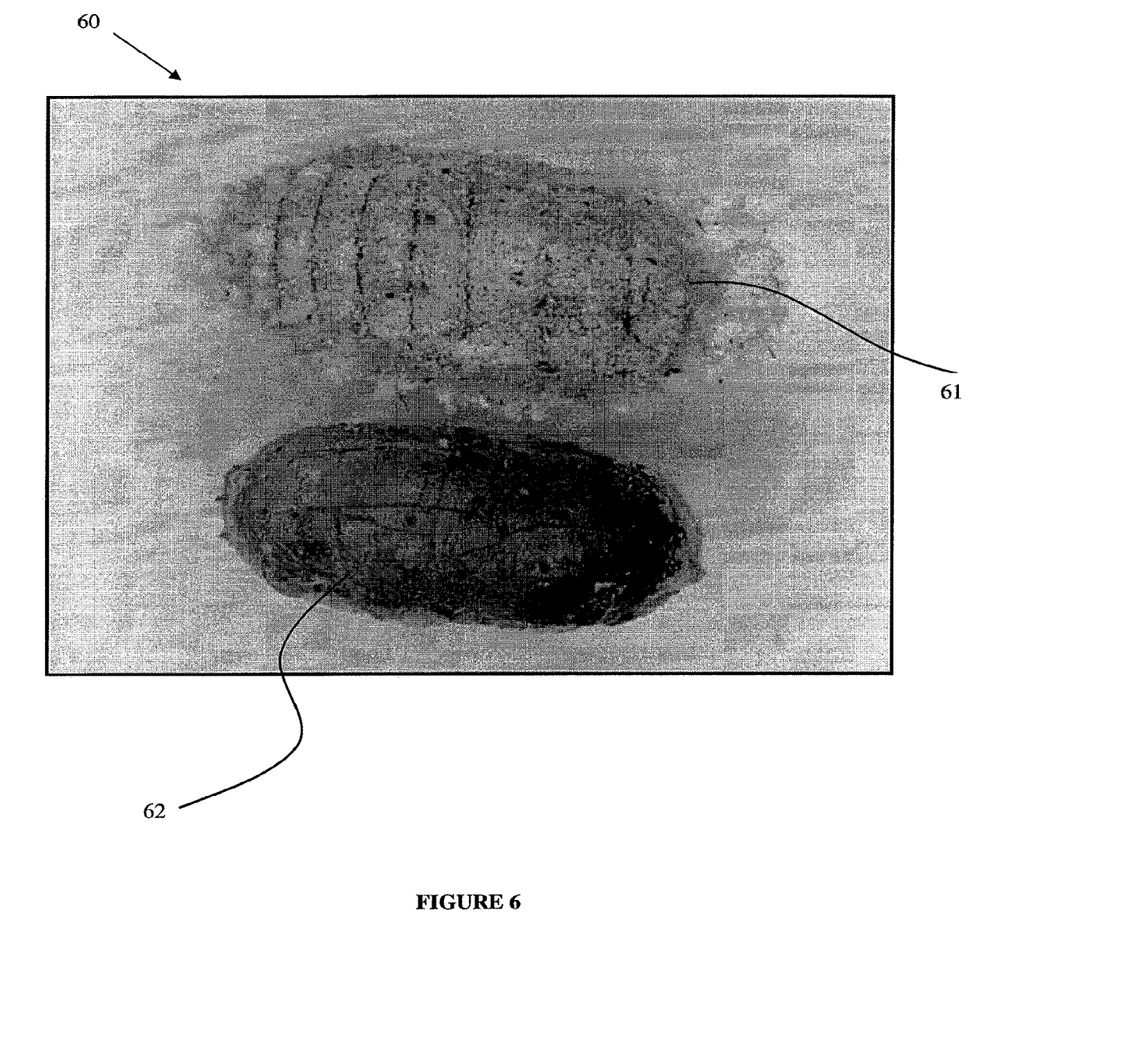
FIG. 6 is a photographic illustration of processed and unprocessed mummified parasitized *solanum* mealybugs containing the pupae of *L. algirica* parasitic wasp.
Figure 7:
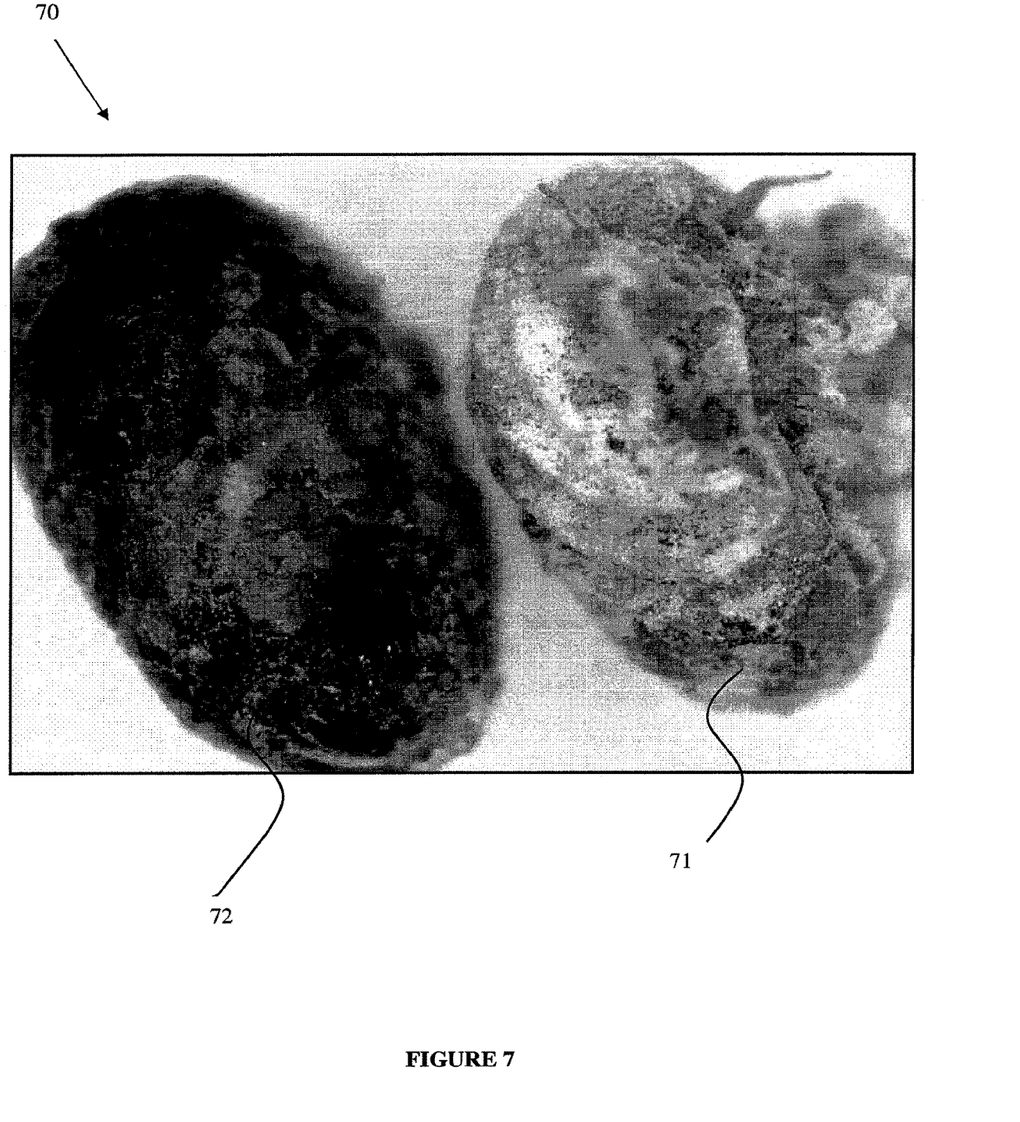
FIG. 7 is a photographic illustration of processed and unprocessed mummified parasitized citrus mealybugs containing the pupae of *A. pseudococci* parasitic wasp.

Reference is now made to FIGS. 6 and 7 in the drawings, in which the novel mummified pupal product is shown alongside an unprocessed mealybug mummy 60, 70. In FIG. 6, an unprocessed *solanum* mealybug mummy 61 is shown, with the body and legs covered by a white mealy wax. The processed mealybug mummy 62 has been stripped of its wax. Both mummies contain the pupa of the *L. algirica* parasitic wasp.

FIG. 7 shows the mummy of an intact, unprocessed citrus mealybug 71, with protruding legs and a covering of soft, fluffy wax. By contrast the processed mummified mealybug product 72 is limbless and devoid of the waxy covering. Both mummies contain the pupa of the parasitic wasp, *A. pseudococci*.

It is understood that the foregoing detailed description is given merely by way of illustration and that modifications and variations may be made therein without departing from the spirit and scope of the invention.

As used herein the term "about" denotes ±10% of the defined amount or measure or value.

In order to understand the invention and to see how it may be implemented in practice, a plurality of preferred embodiments will now be described, by way of non-limiting example only, with reference to the following examples.

Example 1

Storage Capacity of the *Anagyrus pseudococci* Mummies Product

In this experiment, fresh mummies were put into storage at 14° C. and complete darkness. Samples from the stored batch were taken out of storage at different time intervals, between 0 and 28 days, and adult wasps were left to emerge at 25° C. Emergence rate and female fertility were examined for each storage interval.

Figure 8:
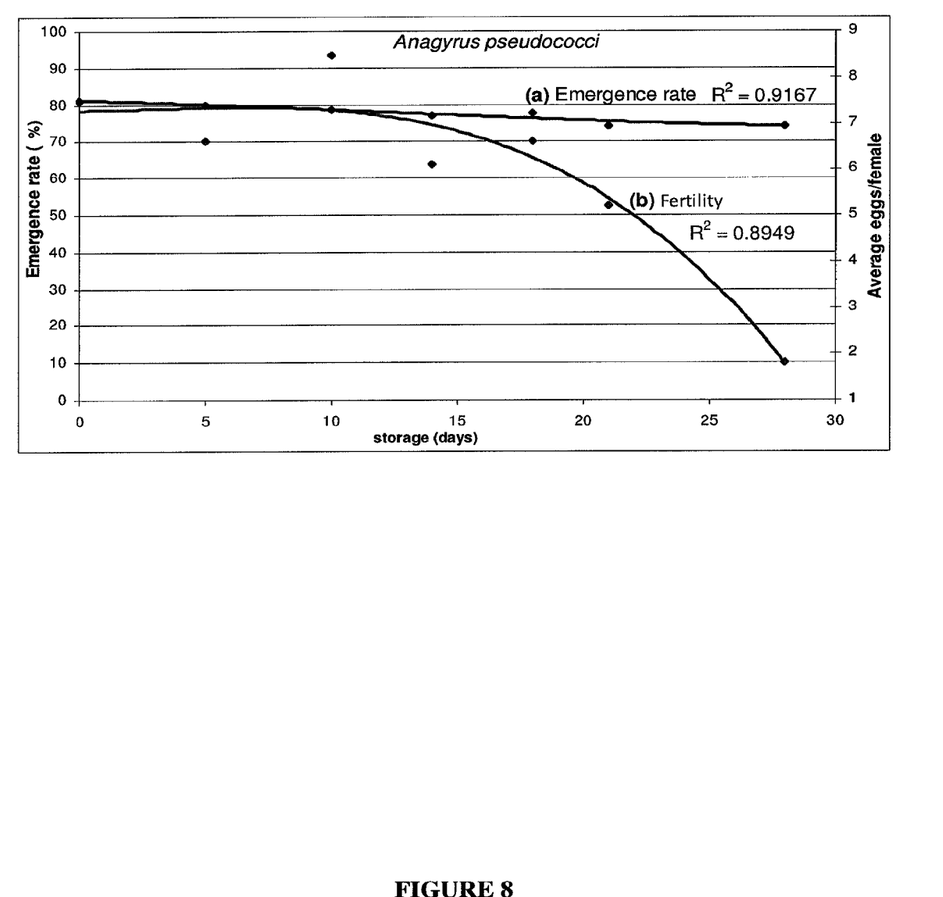
FIG. 8 is a graphic illustration showing the storage capacity of the *Anagyrus pseudococci* mummies product, as an embodiment of the present invention; and, FIG. 9 is a graphic illustration showing storage capacity of the *Leptomastix algirica* mummies product, as a further embodiment of the present invention.

Reference is now made to FIG. 8 showing a graphical representation relating to the storage capacity of the *Anagyrus pseudococci* mummies product. In this figure, graph (a) represents the number of adults divided by the total of mummies in a sample, and graph (b) represents the number of matured eggs in a young (24 Hrs. old) female ovaries.

As shown in FIG. 8, no significant decrease, in both adult emergence rate and fertility, was observed in mummies, which were stored up to 18 days. Thus, it can be concluded that the processed mummies product of the present invention comprising the parasitoid *Anagyrus pseudococci* can be stored for about 18 days before administering/distributing it as a biological control agent (BCA).

Example 2

Storage Capacity of the *Leptomastix algirica* Mummies Product

In this experiment, fresh mummies were put into storage at 12° C. and complete darkness. Samples from the stored batch were taken out of storage at different time intervals, between 0 and 49 days, and adult wasps were left to emerge at 25° C. Emergence rate and female fertility were examined for each storage interval.

Figure 9:
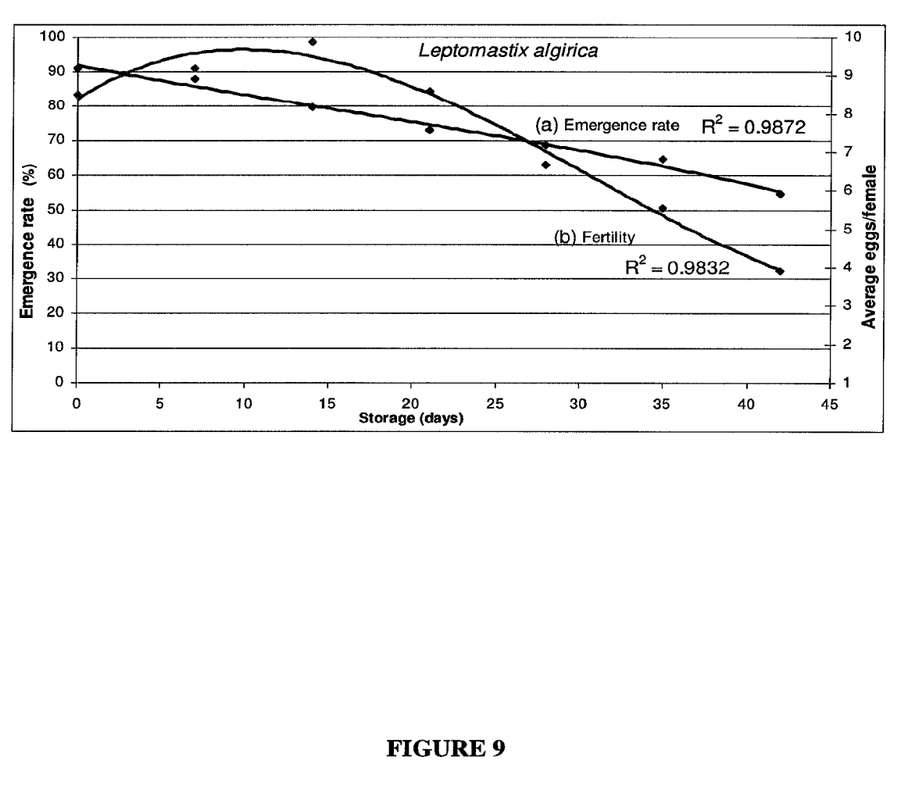

Reference is now made to FIG. 9 showing a graphical representation relating to the storage capacity of the *Leptomastix algirica* mummies product. In this figure, graph (a) represents the number of adults divided by the total of mummies in a sample, and, graph (b) represents the number of mature eggs in a young (24 Hrs. old) female ovaries.

As shown in FIG. 9, no significant decrease in emergence rate was observed in mummies, which were stored up to 14 days. Furthermore, no significant decrease in fertility was observed in adult females that emerged from mummies, which were stored up to 28 days. Thus it can be concluded that the processed mummies product of the present invention comprising the parasitoid *Leptomastix algirica* can be stored for at least about 14 days before administering/distributing it as a biological control agent (BCA).

Example 3

*Leptomastix algirica* Parasitization and the *Phenacoccus solani* Acceptance by the Wasps Fresh mealybugs were supplied daily to the same female wasp in order to learn about the wasp parasitisation potential through time. The different mealybug batches were incubated until parasitisation could be determined (mummy stage). Number of mummies was counted, followed by adult emergence in order to calculate the number of successful parasitisations conducted by the aging female (during different ages), emergence rate of the offspring of different age mothers and, sex ratio of the offspring.

In order to determine *Phenacoccus solani* acceptance by the wasps, vital detached mealybugs were introduced to fresh wasps over a period of 12 days. The wasps were changed daily while the mealybugs were aging in order to test their acceptance by the parasitoids. The suspected parasitized mealybugs batches were incubated until parasitization could be established. Mummies and emerging female and male wasps were recorded.

Example 4

*Anagyrus pseudococci* Parasitization and the *Planococcus citri* Acceptance by the Wasps Fresh mealybugs were supplied daily to the same female wasp in order to learn about the wasp parasitisation potential through time. The different mealybug batches were incubated until successful parasitisation could be determined (mummy stage). Mummies were counted followed by adult emergence in order to calculate the number of successful parasitisation by the aging female (during different ages), the emergence rate of the offspring of different age mothers and sex ratio of the offspring.

In order to assess *Planococcus citri* acceptance by the wasps, vital detached mealybugs were introduced to fresh wasps over a period of 70 hours. The wasps were changed periodically while the mealybugs were aging in order to test their acceptance by the parasitoids. The suspected parasitized mealybugs batches were incubated until parasitization could be established. Mummies and emerging female and male wasps were recorded.

The invention claimed is:
1. A process of producing parasitized mealybug mummies as a mealybug Biological Control Agent (BCA), the process comprising the steps of:
 a) infesting a host plant with 1st instar stage mealybugs;
 b) detaching mealybug nymphs and young females from said host plant;
 c) parasitizing said detached mealybug nymphs and young females;
 d) incubating the parasitized mealybugs to produce a mummified parasitized mealybug mixture;
 e) rinsing the mummified parasitized mealybug mixture;
 f) separating out viable mummified parasitized mealybugs from said mixture;
 g) drying the viable mummified parasitized mealybugs;
 h) packaging said viable mummified parasitized mealybugs, wherein said packaged mummified parasitized mealybugs are devoid of limbs and waxy covering; and
 i) storing and/or distributing said packaged mummified parasitized mealybugs as a mealybug BCA.

2. The process according to claim 1, wherein the packaged mummified parasitized mealybugs are viable for at least 14 days.

3. The process according to claim 1, wherein said mummified parasitized mealybugs are derived from a mealybug species selected from the group consisting of *Planococcus citri, Planococcus ficus, Planococcus vovae, Phenacoccus solani, Phenacoccus madeirensis Phenacoccus herreni, Pseudococcus comstocki, Pseudococcus cryptus, Pseudococcus viburni, Pseudococcus longispinus Dysmicoccus brevipes, Maconellicoccus hirsutus* or a combination thereof.

4. The process according to claim 1, wherein said parasitoid is selected from the group of consisting of endoparasitic wasps, Encyrtidae family, *Leptomastix algirica, Anagyrus pseudococci* or a combination thereof.

5. The process of claim 1, further comprising controlling mealybug infestations, by administering the mealybug BCA (a) to a crop at risk of infestation by mealybugs, or (b) to an infested crop.

6. The process of controlling mealybug infestations according to claim 5, wherein the mealybug BCA can be stored for up to 18 days before administering the mealybug BCA.

7. The process according to claim 1, wherein said step of infesting comprises an additional step of maintaining said 1st instar stage mealybugs for about 25 days at about 25° C., and at about 60% relative humidity, on a factitious plant host, until they reach the 3rd instar nymph or young female stage.

8. The process according to claim 1, wherein said step of infesting comprises an additional step of maintaining said 1st instar stage mealybugs for between about 35 to 42 days at about 27° C., and at about 60% relative humidity on a factitious plant host, until they reach the 3rd instar nymph or young female stage.

9. The process according to claim 7, wherein the factitious plant host is a potato sprout.

10. The process according to claim 1, wherein said step of detaching comprises an additional step of blowing mealybug nymphs or young females from their host plant using an air blower.

11. The process according to claim 1, wherein said step of detaching comprises an additional step of blowing $3^{rd}$ instar mealybug nymphs or young females from their host plant using an air blower.

12. The process according to claim 1, wherein said step of parasitizing mealybug nymphs and young females comprises parasitizing mealybug 3rd instar nymphs and young females.

13. The process according to claim 1, wherein said step of parasitizing mealybug nymphs and young females comprises separating dirt and small mealybugs from larger mealybugs through a sieving tower.

14. The process according to claim 1, wherein said step of parasitizing mealybug nymphs and young females comprises exposing weighed and quantified mealybug nymphs and young females to a prospective parasitoid population in a parasitization cage.

15. The process according to claim 1, wherein the step of incubating the parasitized mealybugs comprises an additional step of incubating the parasitized mealybugs to produce the mummified parasitized mealybug mixture in a parasitization cage.

16. The process according to claim 15, wherein the step of incubating the parasitized mealybugs comprises an additional step of removing parasitized mealybugs from said parasitization cage to be incubated until the parasitoids reach the pupal or pre-pupal stage, while replenishing the parasitization cage with a fresh unparasitized mealybug population.

17. The process according to claim 1, wherein said step of rinsing parasitized mealybugs comprises the additional step of rinsing parasitized mealybugs that have reached the parasitoid's pupal or pre-pupal stage through a sieving tower with water spray nozzles, thereby separating out large viable mealybug mummies from dead or small mealybugs.

18. The process according to claim 1, wherein said step of separating out viable parasitized mealybugs mummies comprises the additional step of selecting floating mealybugs and mummies from mixtures that have been drained in a conical water bath.

19. The process according to claim 1, wherein said packaging step comprises at least one additional step selected from the group consisting of:
 a) weighing and quantifying said parasitized mealybug mummies by counting samples under a stereoscopic microscope;
 b) providing a quantified population of viable parasitized mealybug mummies for storage or distribution; and
 c) mixing parasitized mealybug mummies with fine sawdust in a 5:1 ratio, respectively, in a ventilated and labeled plastic container in preparation for storage at 14° C.

20. The process according to claim 1, wherein the mealybug BCA is packaged in a sealed ventilated container adapted to be attached to a plant or an object adjoining a crop and function as an effective distribution means of the mealybug BCA at a desired location.

\* \* \* \* \*